United States Patent
Kim et al.

(10) Patent No.: US 12,473,201 B2
(45) Date of Patent: Nov. 18, 2025

(54) METHOD FOR PRODUCING LITHIUM COMPOUND

(71) Applicants: POSCO, Pohang-si (KR); RESEARCH INSTITUTE OF INDUSTRIAL SCIENCE & TECHNOLOGY, Pohang-si (KR)

(72) Inventors: Kiyoung Kim, Pohang-si (KR); Gi-Chun Han, Cheongju-si (KR); Young-Seon Ko, Seoul (KR); Hyun Woo Lee, Pohang-si (KR); Kwang Seok Park, Pohang-si (KR); Juyoung Kim, Pohang-si (KR); Woonkyoung Park, Pohang-si (KR); Sang Won Kim, Pohang-si (KR); Woo Chul Jung, Pohang-si (KR); Kee Uek Jeung, Pohang-si (KR); Jung Kwan Park, Pohang-si (KR); Dong Soo Kim, Pohang-si (KR); Sang Gil Lee, Pohang-si (KR); Jin Yeop Wi, Pohang-si (KR); Young Su Kwon, Pohang-si (KR)

(73) Assignees: POSCO CO., LTD, Pohang-si (KR); RESEARCH INSTITUTE OF INDUSTRIAL SCIENCE & TECHNOLOGY, Pohang-si (KR)

( * ) Notice: Subject to any disclaimer, the term of this patent is extended or adjusted under 35 U.S.C. 154(b) by 1035 days.

(21) Appl. No.: 17/275,363

(22) PCT Filed: Dec. 21, 2018

(86) PCT No.: PCT/KR2018/016509
§ 371 (c)(1),
(2) Date: Mar. 9, 2022

(87) PCT Pub. No.: WO2020/054917
PCT Pub. Date: Mar. 19, 2020

(65) Prior Publication Data
US 2022/0194796 A1    Jun. 23, 2022

(30) Foreign Application Priority Data

Sep. 11, 2018 (KR) .................. KR10-2018-0108307

(51) Int. Cl.
*C01B 25/30* (2006.01)
*B01D 9/00* (2006.01)
(Continued)

(52) U.S. Cl.
CPC ............... *C01B 25/30* (2013.01); *B01D 9/00* (2013.01); *B01D 15/361* (2013.01); *B01D 61/42* (2013.01);
(Continued)

(58) Field of Classification Search
CPC ........ C01B 25/30; C01D 15/00; C01D 15/02; C01D 15/06; B01D 9/00; B01D 15/361;
(Continued)

(56) References Cited

U.S. PATENT DOCUMENTS

2013/0302237 A1    11/2013  Correia
2015/0152563 A1*   6/2015   Bourassa ............... C01D 15/08
2018/0166753 A1    6/2018   Byun et al.

FOREIGN PATENT DOCUMENTS

CN    106395864 A    2/2017
JP    2011-168461 A  9/2011
(Continued)

OTHER PUBLICATIONS

Translation of KR 101674393 (Year: 2016).*
(Continued)

*Primary Examiner* — Daniel Berns
*Assistant Examiner* — Joshua Maxwell Speer
(74) *Attorney, Agent, or Firm* — Morgan Lewis & Bockius LLP (57) ABSTRACT

The present invention relates to a lithium compound manufacturing method comprising the steps of heat treatment of lithium-containing ore; roasting the heat-treated ore with sulfuric acid to prepare an acid product; mixing the acid product with leaching water to prepare a leachate; purifying
(Continued)

the leachate; and adding a phosphorus supply material and a basic material to the purified leachate to obtain a solid lithium phosphate.

19 Claims, 3 Drawing Sheets

(51) Int. Cl.
*B01D 15/36* (2006.01)
*B01D 61/42* (2006.01)
*C01D 15/02* (2006.01)
*C01D 15/06* (2006.01)

(52) U.S. Cl.
CPC ........... *B01D 61/422* (2013.01); *C01D 15/02* (2013.01); *C01D 15/06* (2013.01)

(58) Field of Classification Search
CPC .... B01D 61/42; B01D 61/422; B01D 9/0018; C22B 1/02; C22B 3/08; C22B 26/12; C01P 2006/80; Y02P 10/20
See application file for complete search history.

(56) References Cited

FOREIGN PATENT DOCUMENTS

| | | | | |
|---|---|---|---|---|
| JP | 2011168858 | A | * | 9/2011 |
| KR | 10-2012-0005980 | A | | 1/2012 |
| KR | 10-2012-0063424 | A | | 6/2012 |
| KR | 10-2014-0019622 | A | | 2/2014 |
| KR | 10-2014-0022576 | A | | 2/2014 |
| KR | 10-2016-0027348 | A | | 3/2016 |
| KR | 10-1604954 | B1 | | 3/2016 |
| KR | 2016027348 | A | * | 3/2016 ............ C22B 26/12 |
| KR | 10-2016-0136314 | A | | 11/2016 |
| KR | 101674393 | B1 | * | 11/2016 |
| KR | 10-1682217 | B1 | | 12/2016 |
| KR | 10-1753092 | B1 | | 7/2017 |
| KR | 10-2017-0107546 | A | | 9/2017 |
| KR | 10-2018-0039303 | A | | 4/2018 |
| KR | 10-2018-0074177 | A | | 7/2018 |
| KR | 10-2018-0074855 | A | | 7/2018 |
| WO | WO-2015123762 | A1 | * | 8/2015 ........... B01D 61/025 |
| WO | 2018/070726 | A1 | | 4/2018 |

OTHER PUBLICATIONS

Translation of JP 2011168858 (Year: 2011).*
Translation of KR 20160027348 (Year: 2016).*
https://web.archive.org/web/20120615020049/http://www.ktf-split.hr/periodni/en/abc/kpt.html (Year: 2012).*
https://www.echemi.com/cms/1717479.html (Year: 2025).*
https://chem.libretexts.org/Bookshelves/General_Chemistry/Map%3A_General_Chemistry_(Petrucci_et_al.)/18%3A_Solubility_and_Complex-Ion_Equilibria/18.5%3A_Criteria_for_Precipitation_and_its_Completeness (Year: 2025).*
https://chem.libretexts.org/Courses/American_River_College/CHEM_309%3A_Applied_Chemistry_for_the_Health_Sciences/08%3A_Acids_and_Bases_Equilibrium_and_Buffers/8.03%3A_Bases-Properties_and_Examples (Year: 2025).*
https://pubchem.ncbi.nlm.nih.gov/compound/Lithium-Hydroxide#section=Physical-Description (Year: 2025).*
International Search Report dated May 30, 2019 issued in International Patent Application No. PCT/KR2018/016509 (with English translation).
Chinese Office Action dated Feb. 11, 2023 issued in Chinese Patent Application No. 201880099360.8.

* cited by examiner

METHOD FOR PRODUCING LITHIUM COMPOUND

CROSS-REFERENCE OF RELATED APPLICATIONS

This application is the U.S. National Phase under 35 U.S.C. § 371 of International Patent Application No. PCT/KR2018/016509, filed on Dec. 21, 2018, which in turn claims the benefit of Korean Application No. 10-2018-0108307, filed on Sep. 11, 2018, the entire disclosures of which applications are incorporated by reference herein.

BACKGROUND OF THE INVENTION

(a) Field of the Invention

The present invention relates to a lithium compound manufacturing method. More specifically, it relates to a lithium compound manufacturing method capable of obtaining a lithium compound such as lithium phosphate and lithium sulfate with high concentration from lithium-containing ore.

(b) Description of the Related Art

Conventionally, as a method of extracting lithium from lithium-containing materials, a method of extracting lithium by heat treatment and roasting from lithium-containing ores or concentrates such as spodumene, has been known.

In addition, methods including leaching acid roasted lithium-containing materials have been known. According to these methods, a lithium-containing material is roasted in the presence of an acid such as sulfuric acid to obtain an acid roasted, lithium-containing material. Lithium was extracted by converting the acid roasted lithium-containing materials into lithium carbonate or lithium hydroxide.

SUMMARY OF THE INVENTION

In the present invention, it is provided lithium compound manufacturing method capable of directly manufacturing lithium phosphate without undergoing a separate process for lithium carbonate or lithium hydroxide from lithium-containing ore.

Thereafter, a lithium compound manufacturing method capable of preparing solid lithium sulfate by mixing with sulfuric acid and producing lithium hydroxide using a bipolar electrodialyzer is provided.

A lithium compound manufacturing method according to an exemplary embodiment of the present invention comprises the steps of heat treatment of lithium-containing ore; roasting the heat-treated ore with sulfuric acid to prepare an acid product; mixing the acid product with leaching water to prepare a leachate; purifying the leachate; and adding a phosphorus supply material and a basic material to the purified leachate to obtain a solid lithium phosphate.

In the step of heat treating the lithium-containing ore, the heat treatment temperature may be 1000 to 1250° C.

In the step of preparing the acid product, an equivalent ratio (lithium:sulfuric acid) of lithium in the heat-treated ore and the sulfuric acid may be 1:1.1 to 1:1.4.

In the step of preparing an acid product, the roasting temperature may be 150 to 250° C.

In the step of preparing the leachate, a weight ratio (acid product:leachate) of the acid product and the leachate may be 1:1 to 1:3.

The step of purifying the leachate can comprise:
separating primary impurities including Al, Si or a combination thereof by adjusting the pH of the leachate to 5 to 8; and removing secondary impurities including Mg, Ca, Mn or a combination thereof by adjusting the pH of the leachate from which the primary impurities are separated to 10 or more.

In the step of separating the primary impurities, 20 to 40 g/L of lithium-dissolved lithium hydroxide aqueous solution may be added to adjust the pH.

In the step of separating the secondary impurities, sodium carbonate may be added to the leachate from which the primary impurities are separated and the leachate is stirred, and then sodium hydroxide is added and the leachate stirred.

In the step of separating the secondary impurities, an equivalent ratio of the secondary impurity and the sodium carbonate (secondary impurity:sodium carbonate) may be 1:3 to 1:5.

After the step of separating the secondary impurities, the method may further comprise, passing the leachate from which the secondary impurities are separated through an ion exchange resin to remove residual Ca.

In the step of obtaining the lithium phosphate, the basic material may control the pH of the purified leachate to 9 to 12.

In the step of obtaining the lithium phosphate, the phosphorus supply material may contain at least one of phosphoric acid, sodium phosphate and lithium phosphate, and the basic material may contain at least one of sodium hydroxide, calcium hydroxide, potassium hydroxide, barium hydroxide, magnesium hydroxide and calcium oxide.

In the step of obtaining the solid lithium phosphate, a remaining filtrate which is caused the solid lithium phosphate extraction may be used as the leaching water.

The method can further comprise, obtaining a solid lithium sulfate by reacting the solid lithium phosphate with sulfuric acid.

After the step of obtaining the solid lithium sulfate, the method can further comprise:
obtaining an aqueous solution of lithium sulfate by dissolving the solid lithium sulfate in a solvent; and obtaining an aqueous solution of lithium hydroxide by adding the aqueous solution of lithium sulfate to a bipolar electrodialyzer.

The step of obtaining the solid lithium sulfate can comprise:
mixing the lithium phosphate with a phosphoric acid solution having a concentration of 30 to 50 wt %; preparing a mixture by adding sulfuric acid to lithium phosphate mixed with the phosphoric acid solution; and filtering the mixture and separating the solid lithium sulfate and filtrate.

In the step of mixing the lithium phosphate with a phosphoric acid solution, the filtrate may be used as the phosphoric acid solution.

In the step of separating into the solid lithium sulfate and filtrate, a total concentration of phosphorus (P) and sulfur(S) in the filtrate may be 5 mol/L or more.

In the step of obtaining the aqueous solution of lithium hydroxide, a desalting solution in which 1.5 to 2.0 g/L of lithium is dissolved may be obtained, together with the lithium hydroxide aqueous solution.

In the step of obtaining the aqueous solution of lithium sulfate, the desalting solution may be used as the solvent.

After the step of obtaining the aqueous lithium hydroxide solution, the method can further comprise:

drying the aqueous solution of lithium hydroxide to crystallize; and obtaining a crystallization filtrate in which the crystallized lithium hydroxide and 33 to 37 g/L of lithium are dissolved.

In the step of purifying the leachate, the crystallization filtrate may be used to purify the leachate.

In the step of obtaining the aqueous solution of lithium sulfate, by adding the crystallization filtrate together, the pH of the lithium sulfate aqueous solution may be adjusted to 10 or higher.

The lithium compound manufacturing method according to an exemplary embodiment of the present invention can directly manufacture lithium phosphate without undergoing a separate process for lithium carbonate or lithium hydroxide from lithium-containing ore. This can reduce the number of processes and improve productivity.

In addition, solid lithium phosphate may be mixed with sulfuric acid to prepare solid lithium sulfate, and lithium hydroxide may be prepared using a bipolar electrodialyzer.

DETAILED DESCRIPTION OF THE EMBODIMENTS

Terms such as first, second and third are used to describe various parts, components, regions, layers and/or sections, but are not limited thereto. These terms are only used to distinguish one part, component, region, layer or section from another part, component, region, layer or section. Accordingly, the first part, component, region, layer or section described below may be referred to as a second part, component, region, layer or section within a range that does not depart from the range of the present invention.

The terminology used herein is only for referring to a specific exemplary embodiment, and is not intended to limit the present invention. Singular forms as used herein also include plural forms unless the phrases clearly indicate the opposite. The meaning of "comprising" as used in the specification specifies a specific characteristic, area, integer, step, action, element and/or component. In addition, it does not exclude the presence or addition of other characteristics, areas, integers, steps, actions, elements and/or components.

When a part is referred to as being "on" or "above" another part, it may be directly on or above another part, or it may be followed by another part in between. In contrast, if a part is referred to as being "directly on" another part, no other part is intervened.

Although not defined differently, all terms including technical and scientific terms used herein have the same meaning as commonly understood by a person of an ordinary skill in the technical field to which the present invention belongs. Terms defined in a commonly used dictionary are additionally interpreted as having a meaning consistent with the related technical literature and the presently disclosed content, and are not interpreted in an ideal or very formal meaning unless defined.

Hereinafter, an exemplary embodiment of the present invention will be described in detail so that a person of an ordinary skill in the technical field to which the present invention belongs can be easily implemented. As those skilled in the art would realize, the described embodiments may be modified in various different ways, all without departing from the spirit or scope of the present invention.

Lithium Compound Manufacturing Method

A lithium compound manufacturing method according to an exemplary embodiment of the present invention comprises the steps of heat treatment of lithium-containing ore; roasting the heat-treated ore with sulfuric acid to prepare an acid product; mixing the acid product with leaching water to prepare a leachate; purifying the leachate; and adding a phosphorus supply material and a basic material to the purified leachate to obtain a solid lithium phosphate.

In addition, it may include a step of reacting solid lithium phosphate with sulfuric acid to obtain solid lithium sulfate. In addition, after the step of obtaining solid lithium sulfate, the step of dissolving solid lithium sulfate in a solvent to obtain an aqueous solution of lithium sulfate, and adding the aqueous solution of lithium sulfate to a bipolar electrodialyzer to obtain an aqueous solution of lithium hydroxide.

First, in the step of heat treating the lithium-containing ore, the lithium-containing ore can be heat treated at a temperature of 1000 to 1250° C. When using spodumine ore as a lithium-containing ore, α-spodumine ore can be converted into β-spodumine ore through heat treatment. The spodumine ore may contain 2.5 to 3.5 wt % of lithium.

Next, in the step of preparing the acid product, the heat-treated ore is roasted with sulfuric acid. At this time, the equivalent ratio of lithium in the heat-treated ore and sulfuric acid may be 1:1.1 to 1:1.4. The concentration of sulfuric acid may be more than 95%. In addition, the roasting temperature may be 150 to 250° C.

Next, in the step of preparing the leachate, the acid product is mixed with the leaching water to prepare the leachate. As the leaching water, one or more among distilled water, tap water, demineralized water generated during bipolar electrodialysis, and remained filtrates after lithium phosphate extraction process, may be used. In order to sufficiently leach the acid product, the weight ratio of the acid product and the leaching water may be 1:1 to 1:3.

Next, in the step of purifying the leachate, impurities present in the leachate are removed.

The step of purifying the leachate can comprise:
separating primary impurities including Al, Si or a combination thereof by adjusting the pH of the leachate to 5 to 8; and removing secondary impurities including Mg, Ca, Mn or a combination thereof by adjusting the pH of the leachate from which the primary impurities are separated to 10 or more. After the step of separating the secondary impurities, the method may further comprise, passing the leachate from which the secondary impurities are separated through an ion exchange resin to remove residual Ca.

In the step of separating the primary impurities, Al and Si exhibit amphoteric properties that are ionized in strong acids and strong alkalis. The pH can be adjusted from 6 to 7 to remove Al and Si. To adjust the pH, an aqueous solution of lithium hydroxide in which 20 to 40 g/L of lithium is dissolved can be added. In addition to the lithium hydroxide aqueous solution, an aqueous solution containing at least one of sodium hydroxide, potassium hydroxide, calcium hydroxide, magnesium hydroxide, barium hydroxide, calcium oxide, and calcium carbonate may be added as a basic material.

In the step of separating secondary impurities, the pH can be adjusted to 10 or higher to remove Mg, Ca, Fe and Mn. To adjust the pH, one or more of sodium carbonate and sodium hydroxide can be added.

More specifically, sodium carbonate may be added to the leachate from which the primary impurities are separated and stirred, and then sodium hydroxide may be added and stirred. The reaction formula between sodium carbonate and secondary impurities ($Me^{2+}$) may be as follows.

$$Me^{2+}+Na_2CO_3 \rightarrow MeCO_3+2Na^+ \quad \text{[Reaction formula 1]}$$

Thereafter, the reaction formula of sodium carbonate and secondary impurities ($Me^{2+}$) made sequentially may be as follows.

$$Me^{2+}+2NaOH \rightarrow Me(OH)_2+2Na^+ \quad \text{[Reaction formula 2]}$$

The equivalent ratio of the secondary impurity and sodium carbonate may be 1:3 to 1:5. Next, by passing the leachate through an ion exchange resin, even residual Ca can be removed.

Next, in the step of obtaining solid lithium phosphate, a phosphorus supply material and a basic material are added to the purified leachate to obtain solid lithium phosphate.

The input amount of phosphorus supply material may be 0.5 to 1.5 equivalents based on lithium in the leachate. If the range is satisfied, the recovery rate of lithium phosphate is high and excessive phosphoric acid may not be added. Due to this, the concentration of residual phosphoric acid may be lowered after recovery of lithium phosphate.

At this time, the basic material may adjust the pH of the purified leachate to 9 to 12. Carbonate or the like present in the leachate may precipitate at a pH of 9 or higher, but the pH of the leachate may be lowered to 9 or less due to the introduction of a phosphorus supply material. For this, basic material can be added together. Through this, the pH of the leachate can be adjusted to 9 to 12.

The phosphorus supply material may contain one or more of phosphoric acid, sodium phosphate and lithium phosphate. Meanwhile, the basic material may include one or more of sodium hydroxide, calcium hydroxide, potassium hydroxide, barium hydroxide, magnesium hydroxide and calcium oxide.

When phosphoric acid is added as a phosphorus supply material and sodium hydroxide is added as a basic material, the reaction equation can be as follows.

$$3Li^++H_3PO_4+3NaOH \rightarrow Li_3PO_4+3Na^++3H_2O \quad \text{[Reaction formula 3]}$$

The filtrate remaining after extraction of solid lithium phosphate can be used as the leaching water enable for the manufacture of the leachate. The remaining filtrate after extraction of solid lithium phosphate may contain 0.5 to 1.0 g/L of lithium.

Figure 1:
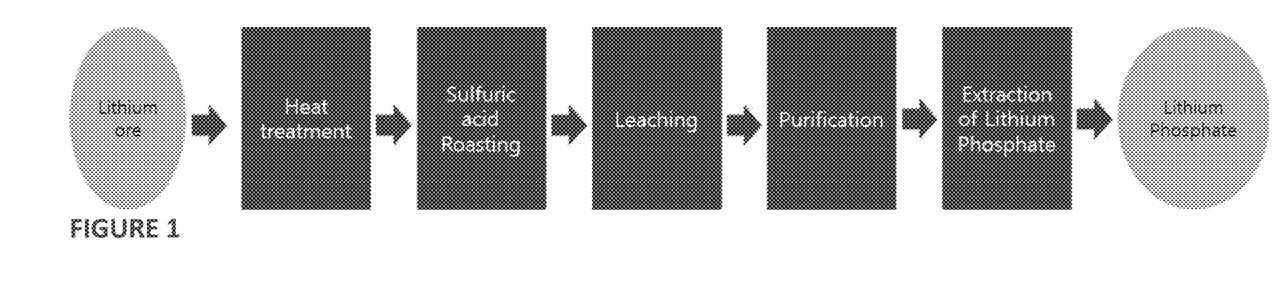
FIG. 1 is a flow chart showing a method for producing lithium phosphate from lithium-containing ore according to an exemplary embodiment of the present invention.
Figure 2:
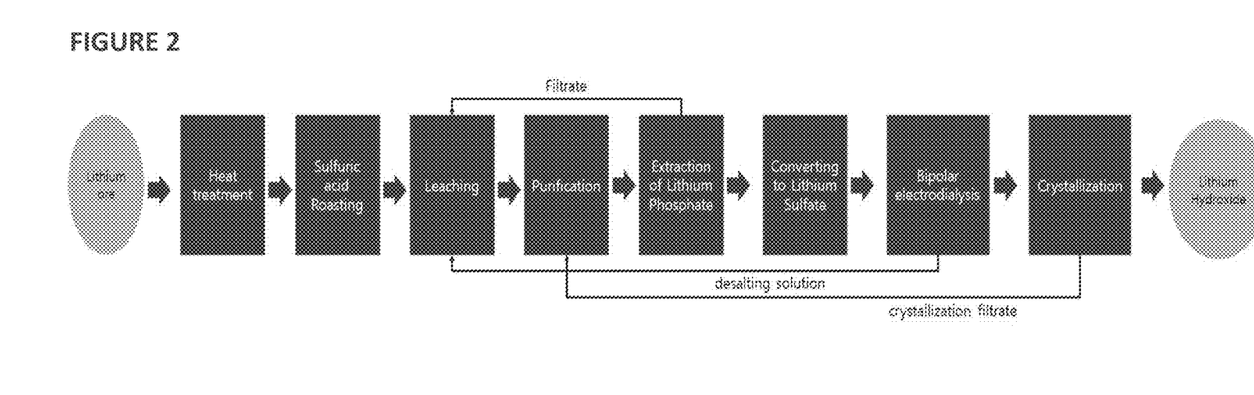
FIG. 2 is a flow chart showing a method for producing lithium hydroxide from lithium-containing ore according to an exemplary embodiment of the present invention.
Figure 3:
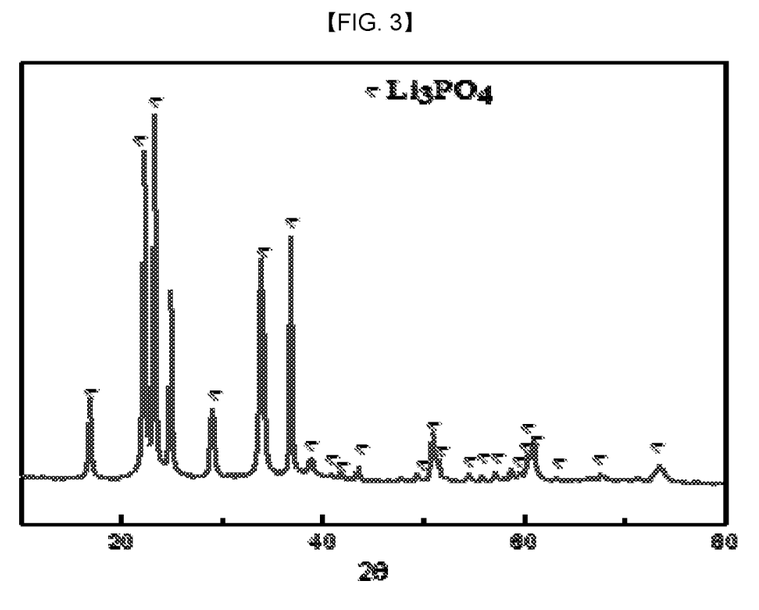
FIG. 3 shows the mineral phase of lithium phosphate in powder form recovered from the lithium-containing ore.

It can be obtained in the form of powder by drying the extracted lithium phosphate. The resulting mineral phase is shown in FIG. 3.

Next, in the step of obtaining solid lithium sulfate, solid lithium phosphate is reacted with sulfuric acid. The step of obtaining the solid lithium sulfate can comprise:
mixing the lithium phosphate with a phosphoric acid solution having a concentration of 30 to 50 wt %;
preparing a mixture by adding sulfuric acid to lithium phosphate mixed with the phosphoric acid solution; and filtering the mixture and separating the solid lithium sulfate and filtrate.

In the step of mixing lithium phosphate with a phosphoric acid solution, a solid lithium phosphate may be mixed with a phosphoric acid solution having a concentration of 30 to 50 wt % to make slurry. Next, a mixture can be prepared by adding sulfuric acid to the slurry-formed lithium phosphate and phosphoric acid solution. At this time, a mixture is prepared through a direct reaction of solid lithium phosphate and sulfuric acid, and a reaction such as the following reaction formula may occur.

$$2Li_3PO_4+3H_2SO_4+nH_2O \rightarrow 3Li_2SO_4 \cdot nH_2O+2H_3PO_4 \quad \text{[Reaction formula 4]}$$

The mixture contains a phosphoric acid solution in which sulfuric acid ions are present, and solid lithium sulfate may be precipitated from the phosphoric acid solution. Next, the mixture can be solid-liquid separated by solid lithium sulfate and filtrate. At this time, the filtrate may be a high concentration phosphoric acid solution having a P of 180 to 190 g/L. In addition, the total concentration of phosphorus (P) and sulfur(S) in the filtrate may be 5 mol/L or more.

Accordingly, the filtrate can be used as a phosphoric acid solution in the step of mixing lithium phosphate with a phosphoric acid solution.

Next, in the step of obtaining an aqueous solution of lithium hydroxide, an aqueous solution of lithium sulfate is added to a bipolar electrodialyzer to obtain a desalting solution in which 1.5 to 2.0 g/L of lithium is dissolved together with the aqueous lithium hydroxide solution. In addition, an aqueous sulfuric acid solution can also be obtained.

The desalting solution can be used as a solvent in the step of dissolving solid lithium sulfate in a solvent to obtain an aqueous solution of lithium sulfate. An aqueous sulfuric acid solution can also be used as a solvent in the step of dissolving solid lithium sulfate in a solvent to obtain an aqueous lithium sulfate solution.

Figure 4:
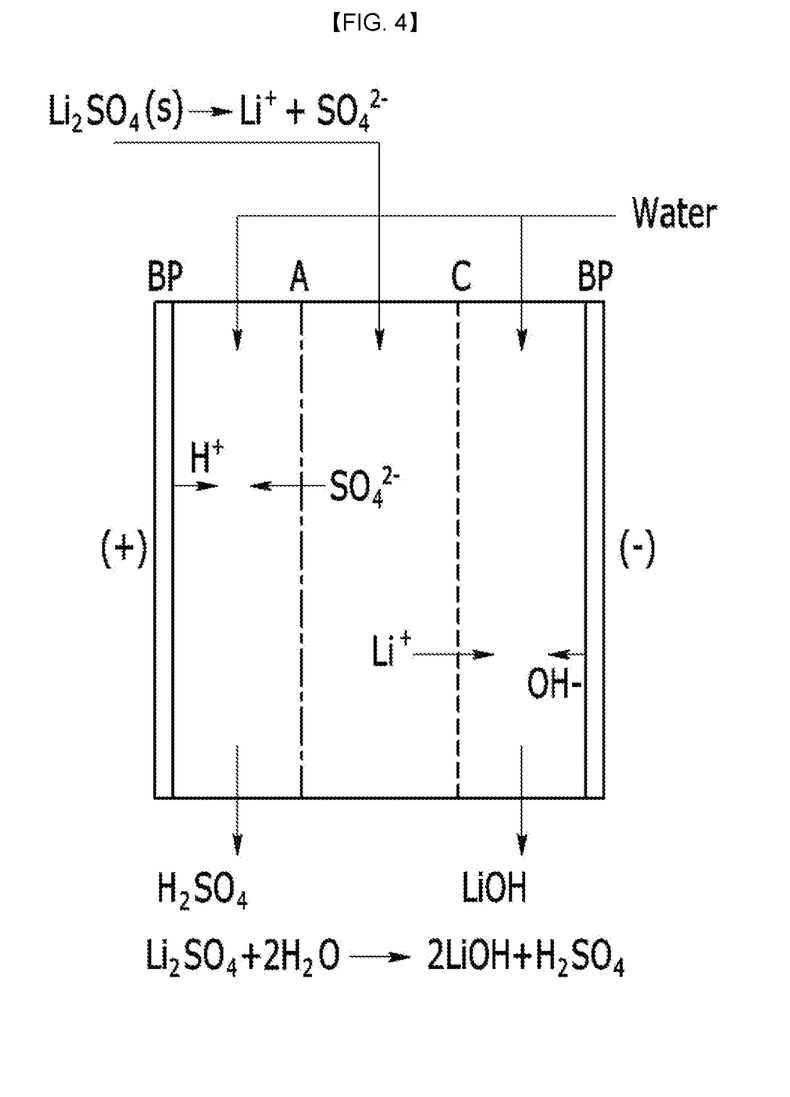
FIG. 4 is a drawing showing a bipolar electrodialyzer used in a lithium compound manufacturing method according to an exemplary embodiment of the present invention.

Referring to FIG. 4, a bipolar electrodialyzer used in the process of converting an aqueous solution of lithium hydroxide can be seen. Specifically, this may have a structure in which a positive electrode cell including an positive electrode, a first bipolar membrane, a negative ion selective dialysis membrane, a positive ion selective dialysis membrane, a second bipolar membrane, and a negative electrode cell including a negative electrode are sequentially disposed.

After the step of obtaining an aqueous solution of lithium hydroxide, the step of drying and crystallizing the aqueous solution of lithium hydroxide and obtaining a crystallization filtrate in which the crystallized lithium hydroxide and 33 to 37 g/L of lithium are dissolved may be further included.

By drying and crystallizing the aqueous lithium hydroxide solution, lithium hydroxide in powder form can be obtained. On the other hand, a crystallization filtrate in which 33 to 37 g/L of lithium is dissolved can be obtained.

Such a crystallization filtrate can be used for purification of the leachate in the step of purifying the leachate. In addition, in the step of obtaining an aqueous solution of lithium sulfate, a crystallization filtrate may be added together to adjust the pH of the aqueous solution of lithium sulfate to 10 or more.

Hereinafter, a specific exemplary embodiment of the present invention will be described. However, the following exemplary embodiment is only a specific exemplary embodiment of the present invention, and the present invention is not limited to the following exemplary embodiment.

EXEMPLARY EMBODIMENT

Spodumin lithium-containing ore was heat treated at 1100° C. The composition is shown in Table 1 below, before and after heat treatment. It can be seen that the lithium-containing ore showed lithium content of 2.96 wt %, and the composition after heat treatment did not change significantly.

TABLE 1

| Element(wt %) | Li | Al | Si | Ca | Mg | Na | K | P | S | Mn | Fe | Cr |
|---|---|---|---|---|---|---|---|---|---|---|---|---|
| ore containing lithium | 2.96 | 12.90 | 29.52 | 0.42 | 0.22 | 0.44 | 0.65 | 0.055 | 0.0071 | 0.13 | 1.22 | 0.009 |
| heat-treated ore | 2.96 | 12.99 | 29.70 | 0.43 | 0.23 | 0.43 | 0.67 | 0.051 | 0.0068 | 0.13 | 1.21 | 0.010 |

The heat-treated ore was mixed with 98% sulfuric acid, equivalent to 1.3 equivalents of lithium content and acid-roasted at 250° C. for 1 hour. After acid roasting, the chemical composition of the product is shown in Table 2 below.

TABLE 2

| Acid product (wt %) | Li | Al | Si | Ca | Mg | Na | K | P | S | Mn | Fe | Cr |
|---|---|---|---|---|---|---|---|---|---|---|---|---|
| Contents | 2.34 | 10.2 | 23.51 | 0.32 | 0.17 | 0.36 | 0.51 | 0.047 | 7.12 | 0.11 | 1.05 | 0.022 |

Lithium was leached by stirring the acid product and distilled water in a weight ratio of 1:2 at room temperature for 1 hour, and the composition of the leachate is shown in Table 3 below.

TABLE 3

| Atoms (g/L) | Li | Al | Si | Ca | Mg | Na | K | P | S | Mn | Fe | Cr |
|---|---|---|---|---|---|---|---|---|---|---|---|---|
| Leachate | 10.57 | 0.569 | 0.021 | 0.382 | 0.034 | 1.01 | 0.647 | 0.024 | 31.78 | 0.57 | 0.569 | 0.028 |

Impurities such as Al, Si, Mg, Ca, Mn, and Fe in the leachate act as impurities when lithium is recovered as lithium phosphate. In addition, in bipolar electrodialysis, it must be removed from the leachate because it causes process problems.

Among impurities, Al and Si show amphoteric ionization in strong acids and strong alkalis, so it is adjusted the pH to 5 to 8 to leachate and remove them first. Next, the pH of the leachate from which Al and Si has been removed is adjusted to 10 or higher to remove Mg, Ca and Mn.

As a pH adjuster for removing Al and Si, a basic material can be used. Specifically, one of sodium hydroxide, potassium hydroxide, calcium hydroxide, magnesium hydroxide, barium hydroxide, calcium oxide, and calcium carbonate is used to adjust the pH of the leachate. Specifically, the pH of the leachate was adjusted to pH 6.5 with an aqueous LiOH solution. After that, the mixture was stirred at room temperature for 2 hours to perform primary purification.

Table 4 below shows the composition of the leachate before purification and that after the first purification. The pH was adjusted while slowly adding 2.9 g of calcium oxide to 280 mL of the leachate. It can be seen that Al and Si were effectively removed at pH 5 to 8.

TABLE 4

| | concentration (g/L) | | | | | | | | | | | | | | |
|---|---|---|---|---|---|---|---|---|---|---|---|---|---|---|---|
| | Li | S | P | Ca | Mg | K | Al | Fe | Ni | Ti | Cr | Mn | Si | Na | pH |
| Leaching | 11.2 | 33.4 | 0.066 | 0.40 | 0.061 | 0.39 | 1.7 | 1.4 | 0.046 | 0.020 | 0.094 | 0.15 | 0.0023 | 0.91 | 2.2 |
| Purification 1st | 11.2 | 32.7 | 0.066 | 0.56 | 0.065 | 0.39 | 1.7 | 1.3 | 0.046 | 0.020 | 0.092 | 0.15 | 0.0027 | 0.91 | 3.4 |
| | 11.2 | 31.5 | 0.062 | 0.53 | 0.066 | 0.39 | 1.6 | 1.3 | 0.044 | 0.019 | 0.086 | 0.15 | 0.0034 | 0.91 | 4.0 |
| | 11.1 | 29.1 | <0.003 | 0.53 | 0.066 | 0.39 | 0.034 | 0.52 | 0.031 | <0.003 | <0.003 | 0.13 | 0.0012 | 0.93 | 4.8 |
| | 11.2 | 29.0 | <0.003 | 0.52 | 0.065 | 0.39 | <0.003 | 0.43 | 0.025 | <0.003 | <0.003 | 0.12 | 0.00083 | 0.91 | 5.5 |
| | 11.3 | 29.0 | <0.003 | 0.49 | 0.061 | 0.39 | <0.003 | 0.21 | 0.011 | <0.003 | <0.003 | 0.10 | 0.00026 | 0.92 | 6.2 |
| | 11.2 | 28.6 | <0.003 | 0.50 | 0.054 | 0.39 | <0.003 | 0.016 | <0.003 | <0.003 | <0.003 | 0.051 | 0.00014 | 0.90 | 7.0 |
| | 11.2 | 28.6 | <0.003 | 0.50 | 0.042 | 0.39 | <0.003 | <0.003 | <0.003 | <0.003 | <0.003 | 0.015 | 0.00009 | 0.90 | 8.0 |

Alternatively, as a pH adjuster for removing Al and Si, a crystallization filtrate obtainable in the step of crystallizing by drying an aqueous lithium hydroxide solution may be used. This is an aqueous solution of lithium hydroxide in which approximately 30 g/L of lithium is dissolved. Specifically, 9.2 mL of the crystallization filtrate of the post-process per 200 mL of the leachate was injected to adjust the pH to 6 to complete the first purification.

Table 5 below shows the composition of the leachate before purification, the leachate after the first purification, and the crystallization filtrate.

TABLE 5

| | concentration (g/L) | | | | | | | | | | | | | | |
|---|---|---|---|---|---|---|---|---|---|---|---|---|---|---|---|
| | Li | S | P | Ca | Mg | K | Al | Fe | Ni | Ti | Cr | Mn | Si | Na | pH |
| Leaching | 10.93 | 31.20 | 0.058 | 0.357 | 0.051 | 0.341 | 1.58 | 1.19 | 0.039 | 0.018 | 0.081 | 0.127 | <0.003 | 0.811 | 2.0 |
| Purification 1 | 12.11 | 29.78 | <0.003 | 0.343 | 0.047 | 0.359 | <0.003 | 0.063 | 0.006 | <0.003 | <0.003 | 0.119 | <0.003 | 1.10 | 6.1 |
| Crystallization filtrate | 32.6 | 0.22 | <0.003 | 0.020 | <0.003 | 0.59 | 0.024 | <0.003 | <0.003 | <0.003 | <0.003 | <0.003 | 0.005 | 4.55 | — |

After the first purification, $Na_2CO_3$ and NaOH were used as pH adjusters to remove Mg, Ca, and Mn during the second purification. Specifically, 4 equivalents of $Na_2CO_3$ of Ca and Mn concentration was added to the leachate from which Al and Si were removed, followed by stirring at room temperature for 30 minutes. Then, NaOH was added to adjust the pH to 11.6. The mixture was stirred for 2 hours to perform secondary purification.

Table 6 below shows the composition of the leachate after the first purification and the leachate after the second purification. It can be seen that Mg, Fe and Mn was removed at pH 10 or higher by adding phosphoric acid and NaOH.

TABLE 6

| | concentration (g/L) | | | | | | | | | | | | | | |
|---|---|---|---|---|---|---|---|---|---|---|---|---|---|---|---|
| | Li | S | P | Ca | Mg | K | Al | Fe | Ni | Ti | Cr | Mn | Si | Na | pH |
| Purification $1^{st}$ | 11.5 | 29.1 | <0.003 | 0.48 | 0.039 | 0.36 | <0.003 | <0.003 | <0.003 | <0.003 | <0.003 | <0.003 | <0.003 | 0.96 | 6.4 |
| Purification $2^{nd}$ | 11.2 | 28.1 | 0.039 | 0.083 | 0.022 | 0.34 | <0.003 | <0.003 | <0.003 | <0.003 | <0.003 | <0.003 | <0.003 | 1.83 | 10.0 |
| | 11.2 | 28.0 | 0.024 | 0.061 | 0.008 | 0.35 | <0.003 | <0.003 | <0.003 | <0.003 | <0.003 | <0.003 | <0.003 | 2.02 | 10.7 |
| | 11.4 | 28.2 | 0.014 | <0.003 | <0.003 | 0.35 | <0.003 | <0.003 | <0.003 | <0.003 | <0.003 | <0.003 | <0.003 | 2.98 | 11.9 |

Table 7 below shows the composition of the leachate after removal of residual Ca. Most of Ca was removed, but since 0.024 g/L of residual Ca remained, it was removed by passing through an ion exchange resin. Accordingly, the concentration of Ca was detected to be less than 3 ppm.

TABLE 7

| | | concentration (g/L) | | | | | | | | | | | |
|---|---|---|---|---|---|---|---|---|---|---|---|---|---|
| | No. | Li | Al | Si | Ca | Mg | Na | K | P | S | Ti | Mn | Fe | Cr |
| secondary Purified liquid | #1 | 12.94 | 0.004 | 0.01 | 0.023 | <0.003 | 3.94 | 0.880 | <0.003 | 31.57 | <0.003 | <0.003 | <0.003 | <0.003 |
| | #2 | 13.13 | 0.003 | 0.01 | 0.053 | <0.003 | 3.64 | 0.803 | <0.003 | 31.75 | <0.003 | <0.003 | <0.003 | <0.003 |
| | #3 | 6.45 | <0.003 | 0.01 | 0.039 | <0.003 | 2.01 | 0.341 | <0.003 | 16 | <0.003 | <0.003 | <0.003 | <0.003 |
| Treatment liquid | #1 | 6.67 | <0.003 | 0.01 | <0.003 | <0.003 | 1.51 | 0.27 | <0.003 | 14.84 | <0.003 | <0.003 | <0.003 | <0.003 |
| | #2 | 12.61 | 0.003 | 0.01 | <0.003 | <0.003 | 3.92 | 0.854 | <0.003 | 30.75 | <0.003 | <0.003 | <0.003 | <0.003 |
| | #3 | 13.16 | 0.003 | 0.01 | <0.003 | <0.003 | 3.68 | 0.798 | <0.003 | 31.91 | <0.003 | <0.003 | <0.003 | <0.003 |

It was assumed that lithium dissolved in 1 L of the leachate from which impurities were removed through purification was precipitated as lithium phosphate. $H_3PO_4$ (a phosphorus supply material corresponding to the equivalent of lithium concentration), and NaOH (a basic material), were added and stirred at room temperature at 200 rpm. Thereafter, samples were collected and solid-liquid separated to measure the composition of solid and liquid. Table 8 below shows the composition of lithium phosphate, and Table 9 below shows the composition of the filtrate remaining after lithium phosphate was separated.

TABLE 8

| Atoms (wt %) | Li | Al | Si | Ca | Mg | Na | K | P | S | Mn | Fe |
|---|---|---|---|---|---|---|---|---|---|---|---|
| Lithium phosphate | 16.41 | 0.007 | 0.002 | 0.014 | 0.059 | 1.624 | 0.011 | 23.81 | 1.486 | N.D | 0.005 |

TABLE 9

| Atoms (g/L) | Li | Al | Si | Ca | Mg | Na | K | P | S | Mn | Fe | Cr |
|---|---|---|---|---|---|---|---|---|---|---|---|---|
| Filtrate | 0.72 | <0.003 | 0.004 | <0.003 | <0.003 | 33.64 | 0.61 | 2.65 | 28.83 | <0.003 | <0.003 | <0.003 |

As shown in the Table 8 and Table 9, after 1 hour of reaction, the lithium concentration decreased to 0.72 g/L, and the lithium recovery rate was 93.7%. As shown in 2, it can be seen that the dried precipitate is lithium phosphate.

After drying the obtained lithium phosphate at 105° C. for 24 hours, the weight change was measured. The moisture content was 15.7%. The composition of dry lithium phosphate was measured through ICP (Inductively Coupled Plasma) to calculate the amount of sulfuric acid equivalent to 1 equivalent, and the purity of the used sulfuric acid was 95%.

A phosphoric acid solution with a concentration of 30 to 50 wt % was used to make the lithium phosphate slurry, and the phosphoric acid solution was prepared by mixing 85% phosphoric acid solution (DaejeonghwaGeum) and ultrapure water. Lithium phosphate and phosphoric acid solution were mixed in a reaction vessel to make slurry, and sulfuric acid was added while stirring at 200 rpm. At this time, the input speed of sulfuric acid was about 10 g/min.

After the addition of sulfuric acid was completed, the mixture was further stirred for about 40 minutes, and then, solid-liquid separation was performed through conventional vacuum filtration. The pressure during filtration was about 50 mbar. A sample of the recovered filtrate was collected and components were analyzed through ICP analysis, and the results are shown in Table 10 below. The filtrate recovered in the test result showed that P was 189.86 g/L of high concentration phosphoric acid and contained 7.16 g/L of lithium.

TABLE 10

| Acid product (g/L) | Li | Al | Si | Ca | Mg | Na | K | P | S | Mn | Fe |
|---|---|---|---|---|---|---|---|---|---|---|---|
| Filtrate | 7.16 | 0.051 | <0.003 | 0.061 | 0.447 | 12.60 | 0.142 | 189.86 | 114.08 | <0.003 | 0.033 |

The solid lithium sulfate is separated from the mixture. Thereafter, solid lithium sulfate is dissolved using desalting solution, and then converted to lithium hydroxide using a bipolar electrodialyzer.

Here, the desalting solution refers to a desalting solution generated together with an aqueous solution of lithium hydroxide during conversion to lithium hydroxide using a bipolar electrodialyzer.

The preparation of an aqueous solution of lithium sulfate was tested using a desalting solution and solid lithium sulfate. The components of the desalting solution used in the solvent are shown in Table 11 below, and the components of the prepared lithium sulfate aqueous solution (LS solution) are shown in Table 12 below.

TABLE 11

| Atoms (g/L) | Li | S | P | Ca | Mg | Na | K | P | S | Mn | Fe |
|---|---|---|---|---|---|---|---|---|---|---|---|
| desalting solution | 1.62 | 4.36 | 0.319 | <0.003 | <0.003 | 0.004 | <0.003 | 0.319 | 4.36 | <0.003 | <0.003 |

TABLE 12

| Acid product (g/L) | Li | Al | Si | Ca | Mg | Na | K | P | S | Mn | Fe |
|---|---|---|---|---|---|---|---|---|---|---|---|
| LS solution | 33.8 | <0.003 | <0.003 | 0.003 | 0.005 | 0.194 | 0.015 | 2.40 | 83.33 | <0.003 | <0.003 |

The desalting solution contained 1.62 g/L of lithium, 4.36 g/L of sulfur(S), 0.314 g/L of phosphorus (P), and a small amount of sodium (Na) was detected. It was confirmed that the lithium sulfate aqueous solution prepared using the desalting solution contained 33.84 g/L of lithium.

Therefore, in the case of preparing an aqueous solution of lithium sulfate by dissolving solid lithium sulfate using a desalting solution, it can be seen that lithium remaining in the desalting solution is recovered as a sulfuric acid solution, thereby increasing the lithium recovery rate in the process.

The lithium sulfate aqueous solution prepared as described above was diluted with the same desalting solution and ultrapure water, and then converted to lithium hydroxide using a bipolar electrodialyzer. The components of the lithium sulfate aqueous solution (LS stock solution) added to the bipolar electrodialyzer; the prepared lithium hydroxide aqueous solution (BASE); sulfuric acid (acid); and desalting solution (salt); are shown in Table 13 below.

TABLE 13

| Acid product (g/L) | Li | S | P | Ca | Mg | Na | K |
|---|---|---|---|---|---|---|---|
| LS stock solution | 12.62 | 30.97 | 0.004 | <0.003 | <0.003 | 0.073 | 0.006 |
| $H_2SO_4$ (Acid) | 0.474 | 50.71 | 0.005 | <0.003 | <0.003 | 0.004 | <0.003 |
| LiOH (Base) | 24.69 | 0.374 | <0.003 | <0.003 | <0.003 | 0.132 | 0.013 |
| desalting solution (Salt) | 0.708 | 1.91 | <0.003 | <0.003 | <0.003 | 0.003 | <0.003 |

As shown in the Table 13, when an aqueous solution of lithium sulfate is prepared using a desalting solution produced in a bipolar electrodialyzer and then converted to lithium hydroxide, it can be confirmed that the lithium content in the aqueous solution of lithium hydroxide is 24.69 g/L. Therefore, it can be seen that lithium in the desalting solution is recovered as a component of the converted lithium hydroxide aqueous solution.

The prepared aqueous solution of lithium hydroxide was evaporated to 90% of moisture using an evaporation concentrator. The solid components thereof are shown in Table 14 below, and it can be seen that high-purity lithium hydroxide was prepared with almost no impurities. In addition, Table 15 below shows the composition of the crystallization filtrate after crystallization, which is an aqueous solution of lithium hydroxide having 35.86 g/L lithium, which can be used as a pH adjuster when purifying the leachate.

TABLE 14

| Atoms (wt %) | Li | Al | Si | Ca | Mg | Na | K | P | S | Mn | Fe | Cr |
|---|---|---|---|---|---|---|---|---|---|---|---|---|
| Lithium hydroxide | 15.83 | N.D | 0.0003 | N.D | N.D | 0.0006 | N.D | N.D | 0.0047 | N.D | N.D | N.D |

TABLE 15

| Acid product (g/L) | Li | Al | Si | Ca | Mg | Na | K | P | S | Mn | Fe | Cr |
|---|---|---|---|---|---|---|---|---|---|---|---|---|
| Filtrate | 35.86 | 0.005 | 0.043 | 0.022 | <0.003 | 1.60 | 0.151 | <0.003 | 5.80 | <0.003 | 0.003 | <0.003 |

The present invention is not limited to the embodiments and/or exemplary embodiments, but may be manufactured in various different forms, and a person of an ordinary skill in the technical field to which the present invention belongs is the technical idea or essential of the present invention. It will be appreciated that it can be implemented in other specific forms without changing the features. Therefore, it should be understood that the embodiments and/or exemplary embodiments described above are exemplary in all respects and are not limiting.

What is claimed is:

1. A method of manufacturing lithium compound comprising:
   heating a lithium-containing ore;
   preparing an acid product by roasting the heated ore with sulfuric acid;
   preparing a leachate by mixing the acid product with leaching water;
   purifying the leachate;
   obtaining a solid lithium phosphate by adding a phosphorus supply material and a basic material to the purified leachate; and
   obtaining a solid lithium sulfate by reacting the solid lithium phosphate with sulfuric acid,
   wherein, in the step of preparing an acid product,
   an equivalent ratio (lithium:sulfuric acid) of lithium in the heat-treated ore and the sulfuric acid is 1:1.1 to 1:1.4,
   wherein,
   the step of purifying the leachate comprises:
   separating primary impurities including Al, Si or a combination thereof by adjusting the pH of the leachate to 5 to 8; and
   removing secondary impurities including Mg, Ca, Mn or a combination thereof by adjusting the pH of the leachate from which the primary impurities are separated to 10 or more,
   wherein, the step of obtaining the solid lithium sulfate comprises:
   mixing the lithium phosphate with a phosphoric acid solution having a concentration of 30 to 50 wt %;
   preparing a mixture by adding sulfuric acid to lithium phosphate mixed with the phosphoric acid solution; and
   filtering the mixture and separating the solid lithium sulfate and filtrate.

2. The method of claim 1,
   wherein, in the step of heating a lithium-containing ore, temperature is 1000 to 1250° C.

3. The method of claim 1,
   wherein, in the step of preparing an acid product, the roasting temperature is 150 to 250° C.

4. The method of claim 1,
   wherein, in the step of preparing the leachate,
   a weight ratio (acidproduct:leachate) of the acid product and the leachate is 1:1 to 1:3.

5. The method of claim 1, wherein:
   in the step of separating the primary impurities,
   20 to 40 g/L of lithium-dissolved lithium hydroxide aqueous solution is added to adjust the pH.

6. The method of claim 1, wherein:
   in the step of separating the secondary impurities,
   sodium carbonate is added to the leachate from which the primary impurities are separated and the leachate is stirred, and then sodium hydroxide is added and the leachate stirred.

7. The method of claim 6, wherein:
   in the step of separating the secondary impurities,
   an equivalent ratio of the secondary impurity and the sodium carbonate (secondary impurity:sodium carbonate) is 1:3 to 1:5.

8. The method of claim 1, wherein:
   after the step of separating the secondary impurities,
   the method further comprises, passing the leachate from which the secondary impurities are separated through an ion exchange resin to remove residual Ca.

9. The method of claim 1, wherein:
   in the step of obtaining the lithium phosphate,
   the basic material controls the pH of the purified leachate to 9 to 12.

10. The method of claim 1, wherein:
    in the step of obtaining the lithium phosphate,
    the phosphorus supply material contains at least one of phosphoric acid, sodium phosphate and lithium phosphate, and
    the basic material contains at least one of sodium hydroxide, calcium hydroxide, potassium hydroxide, barium hydroxide, magnesium hydroxide and calcium oxide.

11. The method of claim 1, wherein:
    in the step of obtaining the solid lithium phosphate,
    a remaining filtrate which is caused the solid lithium phosphate extraction is used as the leaching water.

12. The method of claim 1, wherein:
    in the step of mixing the lithium phosphate with a phosphoric acid solution,
    the filtrate is used as the phosphoric acid solution.

13. The method of claim 1 wherein: in the step of separating into the solid lithium sulfate and filtrate, a total concentration of phosphorus (P) and sulfur (S) in the filtrate is 5 mol/L or more.

14. The method of claim 1, wherein:
    after the step of obtaining the solid lithium sulfate, the method further comprises:
    obtaining an aqueous solution of lithium sulfate by dissolving the solid lithium sulfate in a solvent; and obtaining an aqueous solution of lithium hydroxide by adding the aqueous solution of lithium sulfate to a bipolar electrodialyzer.

15. The method of claim 14, wherein:
in the step of obtaining the aqueous solution of lithium hydroxide,
a desalting solution in which 1.5 to 2.0 g/L of lithium is dissolved is obtained, together with the lithium hydroxide aqueous solution.

16. The method of claim 15, wherein:
in the step of obtaining the aqueous solution of lithium sulfate,
the desalting solution is used as the solvent.

17. The method of claim 14, wherein:
after the step of obtaining the aqueous lithium hydroxide solution, the method further comprises:
drying the aqueous solution of lithium hydroxide to crystallize; and
obtaining a crystallization filtrate in which the crystallized lithium hydroxide and 33 to 37 g/L of lithium are dissolved.

18. The method of claim 17, wherein:
in the step of purifying the leachate,
the crystallization filtrate is used to purify the leachate.

19. The method of claim 17, wherein:
in the step of obtaining the aqueous solution of lithium sulfate,
by adding the crystallization filtrate together, the pH of the lithium sulfate aqueous solution is adjusted to 10 or higher.

* * * * *